(12) United States Patent
Kaniyar et al.

(10) Patent No.: US 7,503,068 B2
(45) Date of Patent: Mar. 10, 2009

(54) SECURE ISN GENERATION

(75) Inventors: Sanjay Kaniyar, Redmond, WA (US); Art Shelest, Sammamish, WA (US); Nk Srinivas, Sammamish, WA (US); Scott K. Holden, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1036 days.

(21) Appl. No.: 10/779,950

(22) Filed: Feb. 13, 2004

(65) Prior Publication Data

US 2005/0198509 A1 Sep. 8, 2005

(51) Int. Cl.
*H04L 9/00* (2006.01)
(52) U.S. Cl. ............................ 726/22; 713/151; 713/174
(58) Field of Classification Search ................... 726/22
See application file for complete search history.

(56) References Cited

U.S. PATENT DOCUMENTS

| 3,728,535 | A | * | 4/1973 | Dickman et al. ............ 708/835 |
| 2001/0042200 | A1 | * | 11/2001 | Lamberton et al. .......... 713/151 |
| 2002/0083175 | A1 | * | 6/2002 | Afek et al. ................... 709/225 |
| 2002/0187788 | A1 | * | 12/2002 | McKay ........................ 455/450 |
| 2003/0084175 | A1 | | 5/2003 | Kaniyar et al. |
| 2004/0133798 | A1 | | 7/2004 | Swander |
| 2004/0230323 | A1 | * | 11/2004 | Glanzer et al. ................ 700/18 |
| 2004/0249948 | A1 | | 12/2004 | Sethi et al. ................... 709/227 |

OTHER PUBLICATIONS

Bellovin, S., "Defedning Against Sequence Number Attacks", May 1996, Network Working Group, Request for Comments 1948.*
CERT, Advisory CA-2001-09 Statistical Weaknesses in TCP/IP Initial Sequence Numbers, May 1, 2001, CERT.*
Michal Zaleski, "Strange Attractors and TCP/IP Sequence Number Analysis," Copyright 2001, pp. 1-41, http://razor.bindview.com/published/papers/tcpseq.html.
Yogen K. Dalal, "More on Selecting Sequence Numbers," Proceedings of the ACM SIGCOMM/SIGOPS Interprocess Communications Workshop, Mar. 24-25, 1975, Santa Monica, California, vol. 9, No. 3, Jul. 1975, pp. 25-36.
Sanjiv Ahuja, "Designing Packet Sequence Numbers for Communication Networks," IMB Corp.—RTP, Proceedings Computer Networking Symposium, IEEE, Dec. 12, 1979, pp. 60-64.
Vern Paxson, "An analysis of using reflectors for distributed denial-of-service attacks," AT&T Center for Internet Research at ISCI, International Computer Science Institute, Berkeley, CA USA, vern@aciri.org, pp. 38-47.

* cited by examiner

*Primary Examiner*—Nasser G Moazzami
*Assistant Examiner*—Michael S McNally
(74) *Attorney, Agent, or Firm*—Workman Nydegger

(57) ABSTRACT

An initial sequence number generator is provided that prevents the local server from being attacked while maintaining reliable data transfer. A random intermediate value is created that is unique to each connection identifier and is combined with a random value created from a global counter to generate the initial sequence number. The counter capable of monotonically increasing by both a fixed and variable amount for ensuring that the same connection identifier does not have data collisions from competing sequence numbers within a predetermined period of time, and also to ensures randomness of the initial sequence number on a per connection basis for preventing attacks on the local server.

18 Claims, 6 Drawing Sheets

SECURE ISN GENERATION

CROSS-REFERENCE TO RELATED APPLICATIONS

N/A

BACKGROUND OF THE INVENTION

1. The Field of the Invention

The present invention relates to establishing a secure connection between two computers when transferring data using a transport protocol. More specifically, the present invention provides for generating an initial sequence number in the manner that prevents a local server from being attacked while maintaining reliable data transfer.

2. Background and Related Art

Computer systems and related technology effect many aspects of society. Indeed, the computer systems ability to process information has transformed the way we live and work. Computer systems now commonly perform a host of tasks (e.g., word processing, scheduling, database management, etc.) that prior to the advent of the computer system were performed manually. Increasingly, separate computer systems have been coupled to one another to form computer networks over which the computer systems can communicate electronically to share data. As a result, many of the tasks performed at a computer system (e.g., accessing electronic mail and web browsing) include electronic communication with one or more other computer systems via a computer network (e.g., the Internet).

Often, electronic communication on a computer network includes a client computer system (hereinafter referred to as a "remote client") requesting access to a service (e.g., electronic mail or a web page) at a server computer system (hereinafter referred to as a "local server"). Before granting the client access to the service, the server may issue a challenge to the client requiring the client to prove it's identity to the server. A challenge may be a relatively simple one, for example, challenging a user at the client to enter username and password. On the other hand, a challenge may be more complex, such as challenging the client to correctly perform a complex handshake sequence.

One reliable data transport protocol that uses a handshake sequence when challenging a client is known as transmission control protocol (TCP). TCP is used for establishing bidirectional streams, like those used for remote terminal connections (established with telnet or rlogin utilities). TCP is also used for transferring large amounts of data, for example, with file transfer protocol (FFP) or connecting to a Web server.

Unlike most other parts of the Internet Protocol suite (such as Internet Control Message Protocol (ICMP) or User Datagram Protocol (UDP)), TCP establishes a connection between the local and remote site. As mentioned above, these TCP connections are generally reliable; therefore, a challenge to the client in the form of a handshake is used to prevent attackers from gaining access to the connection.

FIG. 1 illustrates a typical TCP three way handshake, i.e., the exchange of three messages, used to establish a connection between a remote 105 client and a local server 110. The remote client 105 sends an initial synchronization (SYN) segment, which includes an initial sequence number (ISN), shown here as $ISN_c$. The local server 110 responds with a SYN 125 comprising its own ISN (shown here as $ISN_s$), and an acknowledgement (ACK) 120. This ACK 120 includes the $ISN_c$ received from the remote client 105 plus one, which among other things lets the remote client 105 know that the local server 110 received it's SYN.

Similar to the local server 110, when the client system 105 receives the SYN 125 and ACK 120 packet, it must send back its own ACK message 130, which will include the servers 110 $ISN_s$ plus one. The ISNs generated from the remote client 105 and the local server 110 used not only to assign sequence numbers to data packets exchanged between the two, but also as a way to ensure that each received the appropriate package and that each is communicating with who they initially believed to be communicating.

Many systems have statistical weaknesses in the methods that are used to generate random TCP initial sequence numbers, possibly allowing an attacker to hijack or close TCP sessions. For example, if an attacker knows or can predict the TCP initial sequence number, they may be able to close the TCP session, hijack it, or inject arbitrary data. In this type of attack, it is not necessary for the attacker to know a specific sequence number. The attacker can simply send a flood of packets that contain likely sequence numbers so that one or more packets which happen to contain a correct sequence number are likely to be accepted. If the set of possible sequence numbers is small enough, or if the sequence numbers can be predicted with some certainty, it becomes relatively simple for an attacker to send rogue packets set with correct sequence numbers.

To protect against these types of attacks, many operating systems use random number generators to choose TCP ISNs. There are, however, several inherent problems associated with current ISN random generators. For example, initial random generator attempted to solve the problem by creating ISNs that were fully random, i.e., there was no requirements for how the numbers should be chosen. The problem with this approach, however, is the potential for data collisions from competing sequence numbers that use the same connection identifier.

For example, a connection could initially be established by a remote client using a particular connection identifier (usually some combination of source/destination IP address and port). The client later gives that connection identifier up after sending its data, and another connection is made by either the same remote client or another remote client using the same connection identifier shortly thereafter. Because the ISN chosen for the subsequent connection was fully random, there is a potential for overlap of sequence numbers for data that was sent in the first connection but not yet received by the local server. To avoid this problem, some protocol standards require that initial sequence numbers be monotonically increasing (or decreasing), not fully random. (It is noted that monotonically increasing within the meaning of this application means a sequence of numbers that continue to increase in value-wrapping from the largest sequence number back to the smallest sequence number is considered monotonically increasing.)

FIG. 2 illustrates how one technique for creating ISNs that are independent of the connection. As shown, random ISNs for each connection are initially chosen without regard to the ISNs chosen for other connections. For example, the random number for a connection $C_1$ 215 may be a first value chosen randomly on a counter value 200. This value is independent of the initial random value chosen for connection $C_2$ 210 or the random value for connection $C_3$ 220. Once the connection is made and the random value for the ISN is determined, however, each subsequent random value is made to increase from the previous value. For example, the second random value $R_4$ for connection $C_3$ 225 must be greater in value than the first random value $R_3$ for the same connection $C_3$ 220. Likewise, the next random value $R_5$ for the same connection $C_3$ 230 is increased in value over the subsequent random ISNs $R_3$, $R_4$ for connection $C_3$ 220, 225, respectively.

The problem associated with this approach, however, is that although the initial random ISN value for a particular connection was random, all subsequent ISN numbers were increased based on a fixed time value. For example, as shown in FIG. 2, even though the initial random ISN ($R_3$) for connection $C_3$ 220 is random (as is the ISN for connections $C_1$ and $C_2$), subsequent ISNs $R_5$, $R_4$ (225, 230) for connection $C_3$ are equally spaced based on a time factor $\Delta t$ 205. Accordingly, similar to the original problems associated with early TCP implementations, if an attacker can determine any one of the ISN values at any one given time, the attacker may predict subsequent ISN values by simply knowing or guessing $\Delta t$, and the amount ISNs increasing over $\Delta t$, with a reasonable degree of certainty. In particular, because IP addresses are frequently shared among or dynamically assigned to multiple users over time, an attacker may use particular connection identifier determine what the ISN for that identifier is at that particular time, subsequently relinquish the connection identifier, and knowing $\Delta t$ predict subsequent ISN and sequence numbers for that identifier to attack a TCP session. Accordingly, there exists a need for generating random ISN values on a per connection identifier basis.

BRIEF SUMMARY OF THE INVENTION

In accordance with exemplary embodiments of the present invention, the above-identified deficiencies and drawbacks of current initial sequence number generators for a data transport protocol are overcome. For example, exemplary embodiments provide for generating an initial sequence number for use by a remote client when assigning sequence numbers to data packets sent to the local server. The initial sequence number being generated in a manner that prevents the local server from being attacked while maintaining reliable data transfer.

Example embodiments provide a random number generator that creates a random input key using arbitrary information maintained secret by the local server. For example, this information maintained secret may be a seed that is based on the timing, state conditions for the local server, or both. In addition, this information may be different for each boot of the system. In any event, at least a portion of the random input key and a portion of a connection identifier, which includes connection information for at least the remote client, are input into a hash function for determining an intermediate value of an initial sequence number.

In order to generate another portion of the initial sequence number, a monotonically increasing counter is created for ensuring that the same connection identifier does not have data collisions from competing sequence numbers within a predetermined period of time. Further, the monotonically increasing counter ensures randomness of the initial sequence number on a per connection basis for preventing attacks on the local server. The counter is incremented a fixed value based on a passage of a predetermined time period, as well as incremented a variable amount depending upon a rate of connections with the local server. More particularly, if the rate of connections is beyond a threshold value, the variable increment is based on a lapsed time. Otherwise, the variable increment is based on each connection established with the local server. Finally, the intermediate value, the fixed value and the variable amount are combined to generate the initial sequence number.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to methods, systems and computer program products for secure generation of initial sequence numbers for a data transport protocol on a per connection identifier basis. The embodiments of the present invention may comprise a special purpose or general-purpose computer including various computer hardware, as discussed in greater detail below.

As previously mentioned, there are several requirements that need to be maintained in the generation of initial sequence numbers (ISNs). For example, the ISN should be monotonically increasing, i.e., always increasing by some amount, in order to prevent data collisions from competing sequence numbers for a same connection identifier. However, as described below, the ISNs should not wrap around too quickly (should not be incremented too rapidly), but should be far enough from the previous generated one so as to permit reincarnation of time-wait-connections (i.e. reuse of the same connection identifier). Most importantly, however, the ISN should be unpredictable for each given connection identifier in order to prevent attacks by spoofing.

Figure 1:
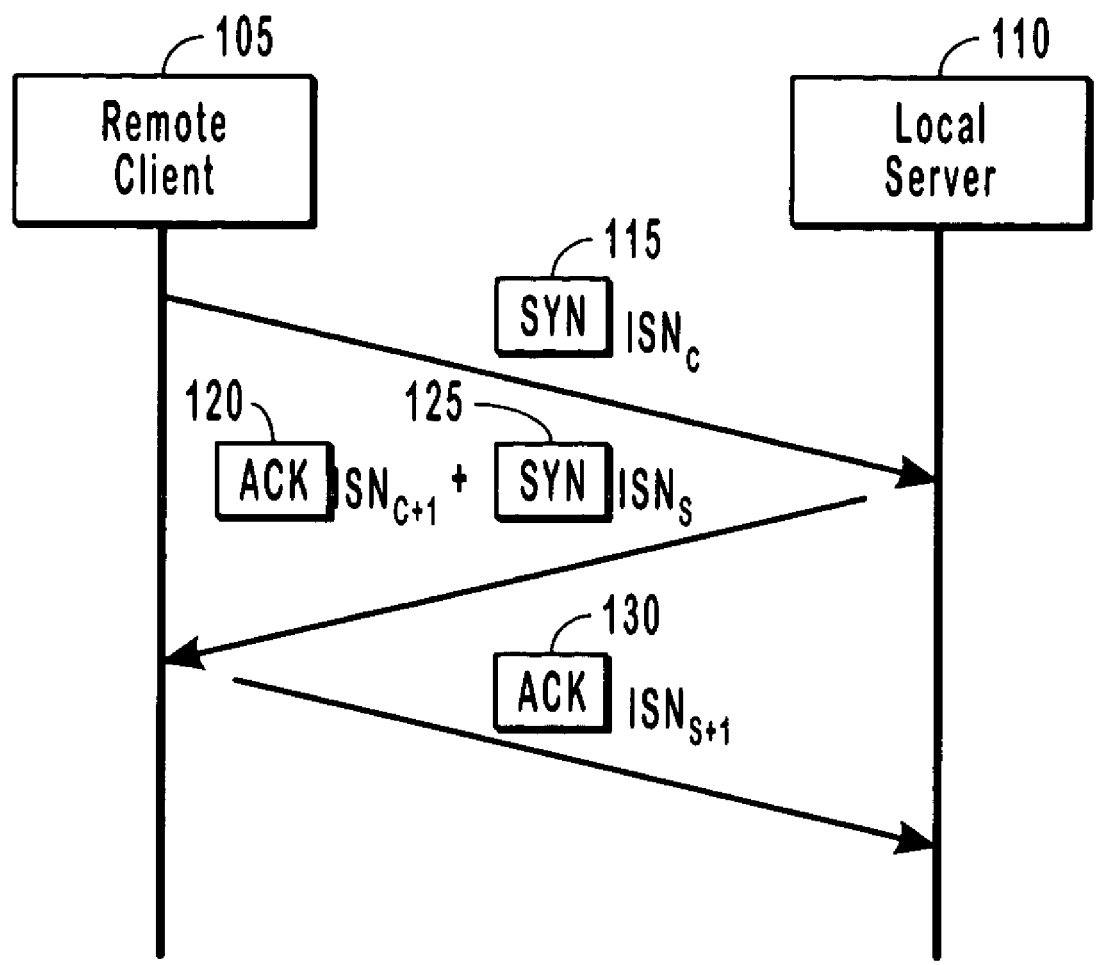
FIG. 1 illustrates a typical three way handshake between a remote client and a local server when establishing a connection for transferring data in accordance with a data transport protocol.
Figure 2:
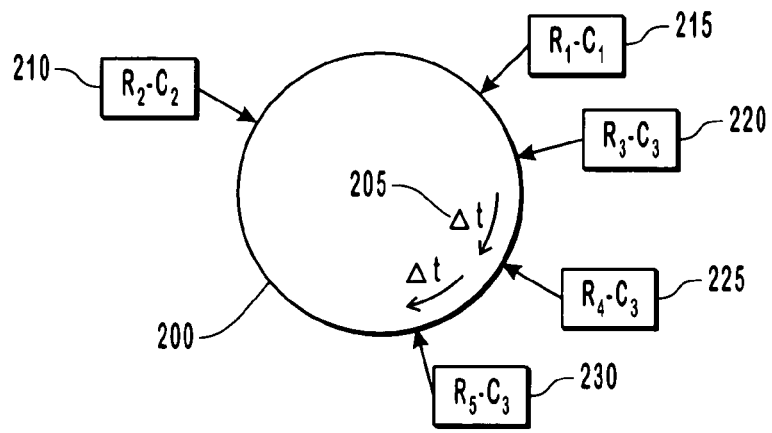
FIG. 2 illustrates a traditional initial sequence number generator that creates initial sequence numbers independent of the connection.
Figure 3A:
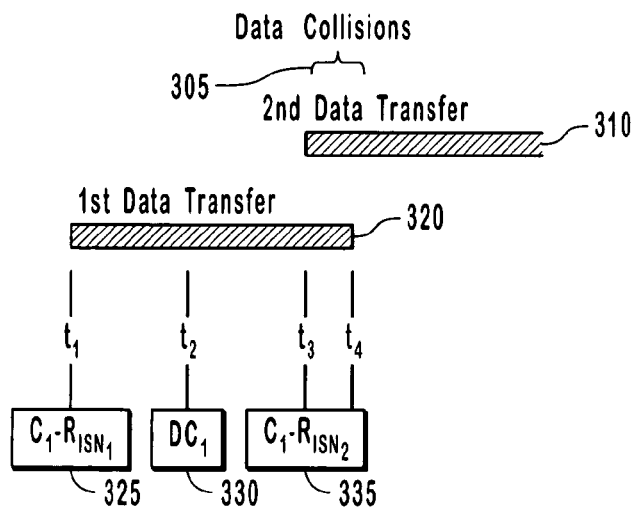
FIG. 3a illustrates one of the requirements for creating an initial sequence number on a per connection basis to prevent data collisions.
Figure 3B:
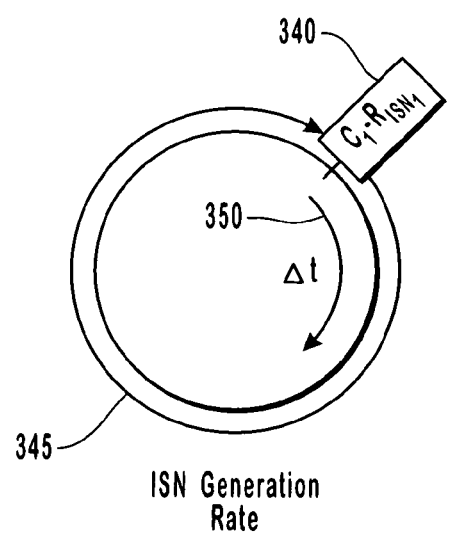
FIG. 3b illustrates another requirement for generating an initial sequence number on a per connection identifier basis in order to prevent data collisions.

The following description of FIGS. 3a and 3b illustrates the importance of some of the above requirements and the problems that needed to be addressed in order to generate initial sequence numbers on a per connection identifier basis. Because FIGS. 3a and 3b are used to describe competing criteria to consider when practicing the present invention, they are used as illustrative purposes only and are not meant to limit or otherwise narrow the scope of the invention.

FIG. 3a illustrates the potential problem associated with the successive use of a connection identifier when an application that previously used the connection identifier did not disconnect properly. As shown at time $t_1$, a connection $C_1$ is initialized with a random ISN $R_{ISN_1}$ at 325. A remote client starts a first data transfer 320 using sequence numbers initialized by the ISN $R_{ISN_1}$. While packets of the data within the data transfer 320 are still en route, remote client, not shown, disconnects at time $t_2$, thereby relinquishing the content identifier $C_1$ as shown by 330. Nevertheless, data continues to be collected by the local server (not shown) for the time period between $t_2$ to $t_4$, as shown.

If connection identifier $C_1$ is reincarnated, i.e., reused by either the same remote client or a different application, and an ISN is generated that is between the previous $R_{ISN_1}$ and the last sequenced number used to transfer data in the first transmission, then a collision of competing sequence numbers will occur thereby resulting in corruption of data. For example, as shown at time $t_3$, connection identifier $C_1$ is established with a random ISN $R_{ISN_2}$ shown in 335, which is between time $t_2$ and $t_4$. Because the first data transfer 320 is still being received at time $t_3$, the sequence numbers in the second data transfer 310 will result in data collisions between times $t_3$ and $t_4$, as indicated by bracket 305. Accordingly, it is desirable that subsequent ISNs generated be far enough from the previously generated one as to allow reincarnation of time-wait-connections.

There is, however, a competing criterion to consider when generating the ISNs in accordance with the present invention. In particular, a similar reliability issue results when the random ISN generator monotonically increase too fast, i.e., when wrapping from the largest sequence number back to the smallest sequence number occurs too rapidly. For example, as shown in FIG. 3b, an initial ISN ($R_{ISN_1}$) is randomly generated for connection identifier $C_1$ at position 340. The data transfer rate 350 for connection identifier $C_1$ occurs over a given time $\Delta t$. If the ISN generator wraps around too quickly (as shown by ISN generation rate 345), such that it catches up with the sequence numbers previously used, there is a potential for data collisions. More specifically, if a connection identifier is reincarnated while data from the previous connection is still being received by the local server, any competing sequence numbers used will result in data collisions.

Figure 4:
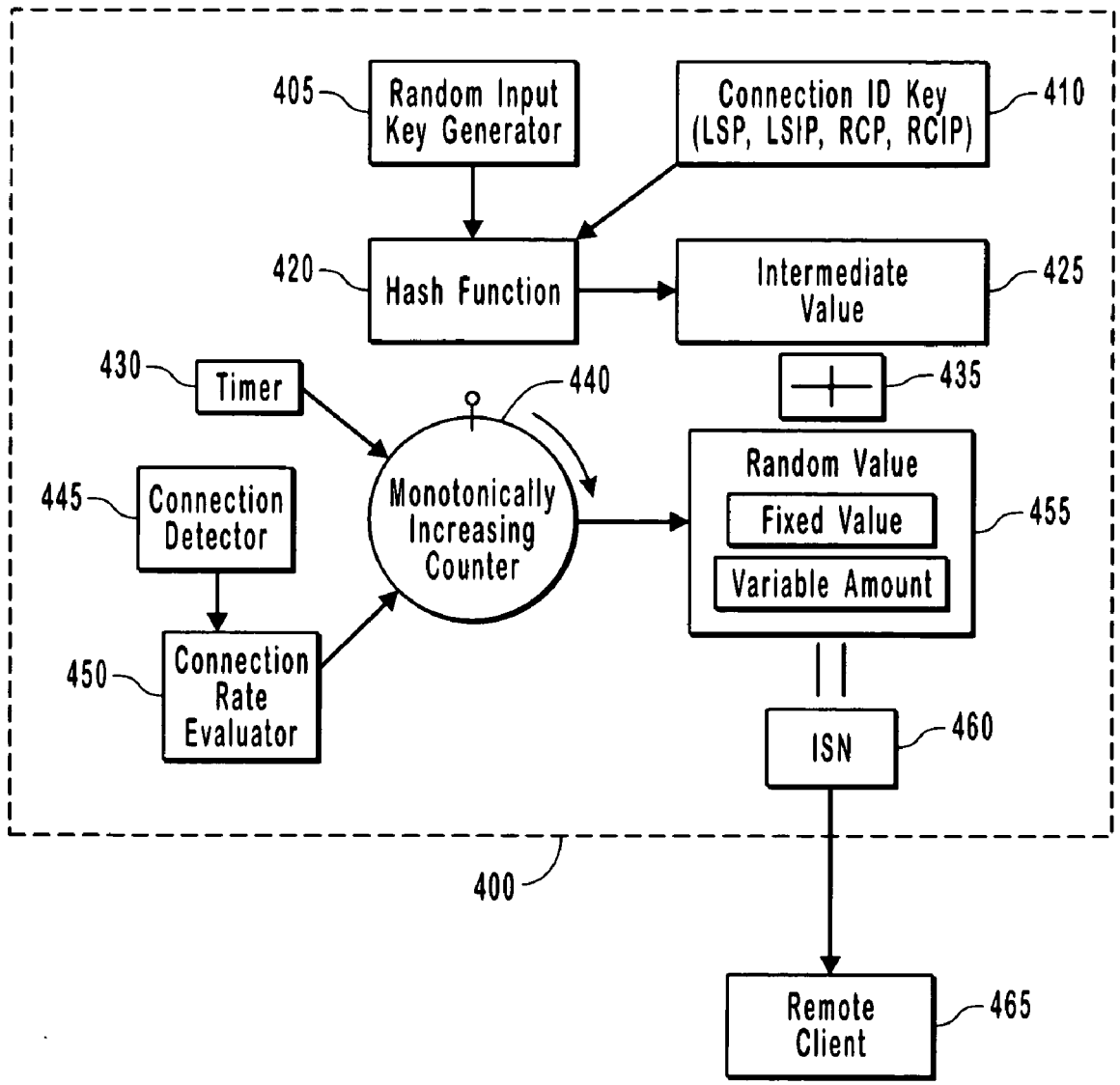
FIG. 4 illustrates a local server initial sequence number generator in accordance with example embodiments of the present invention.

In summary, for those reasons stated above, the requirements needed for generating ISNs on a per connection identifier bases are: (1) the next ISN should be far enough away from the previously generated one so as to permit reincarnation of the time-wait-connections; (2) the ISN generation should not wrap around too quickly; (3) the ISNs need to be monotonically increasing; and (4) they should be unpredictable for a given connection identifier. Accordingly, these requirements were taken into consideration when developing the local server initial sequence number generator 400 shown in FIG. 4.

Example embodiments provide for a random input key generator 405 that uses a private key i.e., arbitrary information maintained secret by the local server, to generate a random input key, a portion of which is used as an input buffer for the hash function 420. This private key is a seed, i.e., private information based on timing and/or state conditions for the local service. For example, the information may be information about state conditions during boot up, e.g., hard drive head positions, whether input was detected by hardware of the local server, etc. Other information used in the private key may include time of day, a day of month, a month, a year, or any other time value and/or random information intended to be private by the local server. The seed is used to generate a random number using the random input key generator 405, which can be any well known random number generator, e.g., RC4.

As previously mentioned, at least a portion of the random number generated in random input key generator 405 may be used to initialize a hash function 420. Further, at least a portion of a connection identifier key 410 can be used as another input buffer into the hash function 420. The connection identifier key 410 may include such information as the port for the local server, the local server routing address, or Internet Protocol (IP) address, a remote client port, and/or a remote client routing or IP address. It is noted, however, that because the client information is different for each connection identifier, the connection identifier key should include at least a portion of connection information for the client in order to allow for random and unique distribution.

As mentioned, the random input key (not shown) and connection identification key 410, or at least a portions thereof, are used to securely initialize hash function 420. Hash function 420, may be any well known hash function such as, e.g. MD5, SHA, Toeplitz, etc., which is used to create an intermediate value 425. As mentioned above, because the connection identifier key 410 includes at least information unique to the remote client connection identifier, which is different for each connection, the intermediate values 425 produced through the hash function 420 will be random and different for each connection identifier. In addition, the seed used in random input key generator 405 assures that these random intermediate values 425 are periodically updated with an additional degree of randomness. As will be described in greater detail below, this intermediate value 425 is combined with a subsequent random value 455 in order to generate the ISN 460 that will be sent to remote client 465.

In order to generate the random value 455, a monotonically increasing counter 440 is created. This counter 440 can be a global ISN counter, such that it can be used by more than one connection identifier in order to generate random ISNs. A periodic timer 430, such as those for a transmission control protocol (TCP) periodic timer, fires over a predetermined time period. Every time this happens, the counter 440 increases by at least a predetermined or fixed amount. This increase ensures that counter 440 increases monotonically. Further, this fixed value that is based on a passage of a predetermined time period through timer 430 contributes the fixed value portion of the random value 455 generated by counter 440.

Example embodiments provide that the reincarnation of a connection identifier, i.e., the reuse of a connection identifier by one or more remote clients, is allowed provided the data transfer rate from the previous connection was less than a predetermined amount (assuming that the data transfer was continuous throughout the lifetime of the connection and the attempt to reincarnate it was made immediately after it was gracefully closed). For example, if periodic timer 430 fired every hundred milliseconds, thereby advancing global ISN counter 440 by 25.6k, a reincarnation of a connection identifier would be allowed provided the data transfer rate was less than 256 kilobytes per second.

In addition to the fixed value component of the random value 455 generated by monotonically increasing counter 440, there is a variable amount that is determined contingent upon the rate of connections to the local server. For example, exemplary embodiments provide for a connection detector 445 that can detect each time a connection is made to the local server. This detection can then be fed to a connection rate evaluator 450, which determines the rate of connections based on, for example, the number of connections per second. This value can then be compared with a threshold value for determining how to increment counter 440 by an amount that varies.

For example, every time the timer 430 fires, a connection counter may be initialized with a maximum number of connections. Each time a connection is created, connection detector 445 would indicate this to connection rate evaluator 450, which decrement the threshold value by one. In accordance with a first embodiment, provided this value is non zero, a random number between a minimum ISN increase per connection and a maximum ISN increase per connection is used towards the ISN. This value would then be used as the variable amount in random value 455. The intermediate value 425 could then be combined with the random value 455 by any means of a mathematical operation 435 (e.g., addition, subtraction, or any function that results in a monotonically increasing combination) to produce random ISN 460 per connection identifier.

The minimum ISN increase per connection identifier is used to ensure that the ISN generated is far enough from the previously generated ISN so as to permit reincarnation of a time-weight-connection. Further, the maximum ISN increase per connection should be set high enough to meet the requirement of unpredictability for a given connection identifier, yet ensure that the ISN does not wrap around too quickly. Experimentation has shown that such a minimum and maximum ISN increase per connection may be between the range of 16 K and 32 K, respectively.

Other embodiments provide that when the connection credit goes to zero, that is when the connection rate exceeds a given threshold value, the incrementing of the counter 440 should not be based on the detection of a connection, but rather should be strictly time based. This embodiment ensures that wrapping of the sequence numbers does not occur too rapidly due to an increase in the rate of connections, which as described above in FIG. 3b potentially creates data collisions. Accordingly, when the connection rate exceeds a threshold value, the variable increment amount for monotonically increasing counter 440 is based on an elapse of time. For example, exemplary embodiments provide that when the number of connections per second exceeds 0x00000444, every millisecond that passes contributes up to 0x000022FB towards the ISN increment. This increment assumes a TCP connection given the constraints provided in the table below regarding sequence space per second, number of such connections per second, and the average increase per connection. Knowing these values yields the average sequence space consumed and the remaining sequence space available, which gives the remaining space per millisecond used in the ISN increment above.

In any event, similar to the connection based increment, this variable amount is combined with the fixed value to produce random value 455, which can then be combined with intermediate value 425 using operation 435, thereby generating ISN 460 for the local server ISN generator 400. This ISN can then be sent to the remote client 465 which will need to respond to the local server with an ACK and SYN with ISN plus one before a connection will be established between the remote client and local server.

As one would recognize, and as alluded to above, there are several factors considered when determining the limits to be placed on the aforementioned values. For example, the total sequence space, the maximum sequence life in seconds (which sets the limit on how fast the ISN generator should wrap), and other such values should be considered when equating the appropriate values to use in ensuring that the requirements for embodiments of the present invention are met. Based on a typical TCP model and experimental use, the following table provides various values, which were used in calculating the example embodiments recited above.

| NAME | VALUE |
| --- | --- |
| Total sequence space | 0xFFFFFFFF |
| Maximum sequence life in seconds | 120 |
| Sequence space per second | 0x02222222 |
| Maximum ISN increase per connection | 32K |
| Minimum ISN increase per connection | 16K |
| Number of such connections/second | 0x00000444 |
| Average increase per connection | 0x00005FFF |
| Average sequence space consumed | 0x01997BBC |
| Remaining sequence space consumed | 0x0088A666 |
| Remaining space per millisecond | 0x000022FB |
| TCP periodic time or value | 100 milliseconds |

Figure 5:
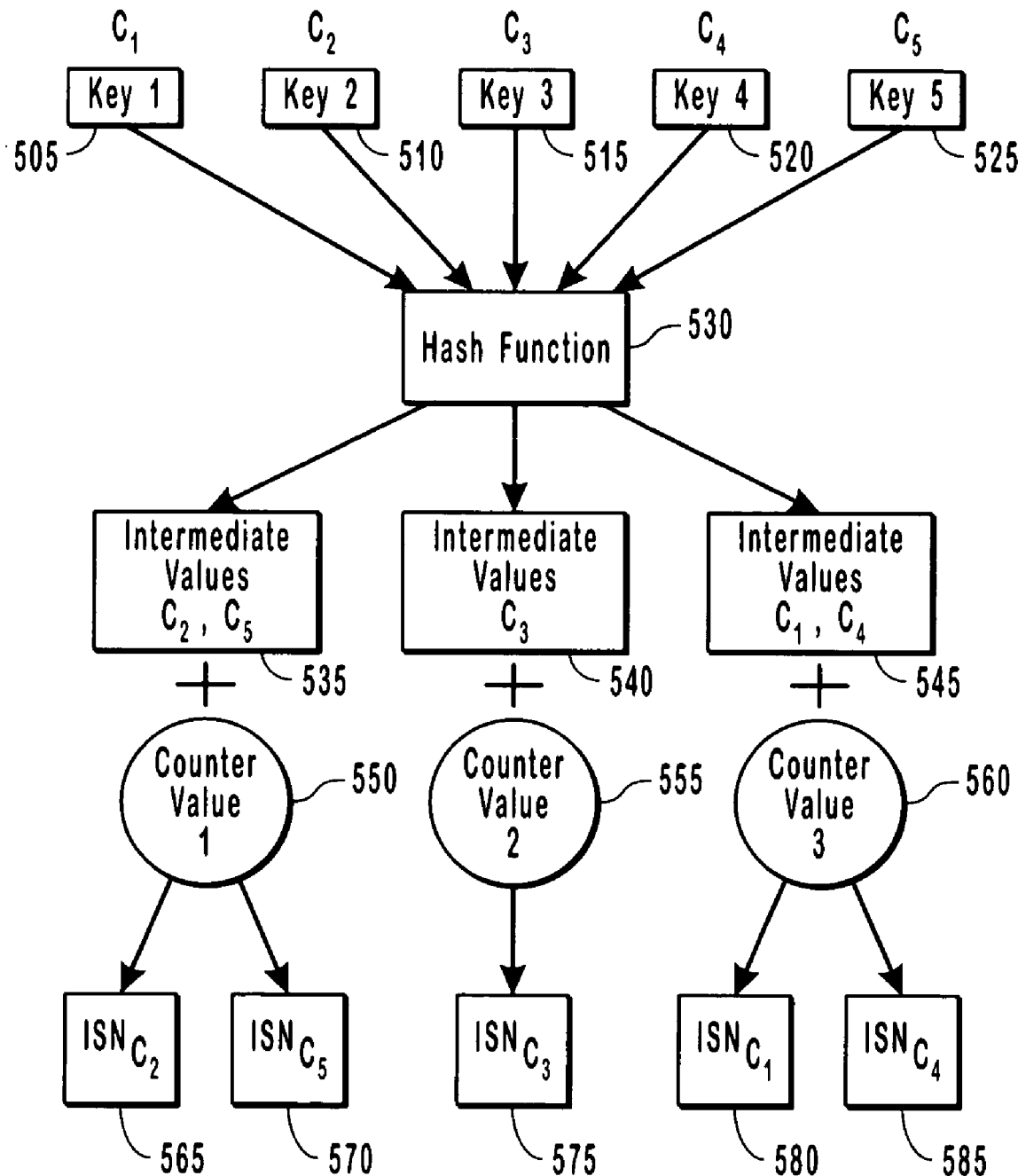
FIG. 5 illustrates the splitting of multiple connection identifiers containing multiple partitions, wherein a counter is maintained for each partition in accordance with example embodiments.

Other example embodiments provide for splitting the connection identifiers into multiple partitions. For each partition a separate counter is maintained. For example, as shown in FIG. 5, connection identifiers $C_1$-$C_5$, which use key identifiers 1-5 (505, 510, 515, 520, 525, respectively), or at least a portion thereof, can be placed into a hash function 530, similar to the hash function previously described. The hash function divides the connection identifiers into groups 535, 540, 545. For example, as shown in FIG. 5, hash function 530 could group and create intermediate values for connection identifiers $C_2$, $C_5$ and place them in group 535. Counter value 1 550 can then produce the appropriate fixed value and variable amount to combine with these intermediate values in determining an ISN for connection identifier $C_2$ and $C_5$, shown here as 565 and 570, respectively. Similarly, hash function 530 can partition and create intermediate values for connection $C_3$, which goes in bucket 540, and connection identifiers $C_1$ and $C_4$, which go in bucket 545. These intermediate values 540 and 545 for the connection identifiers for $C_3$ and $C_1$, $C_4$, can then be combined with the corresponding counter value 555 and 560, respectively, to generate the ISNs for connection identifiers $C_3$, $C_1$, $C_4$ (575, 580, 585, respectively). Dividing the total number of connections among several counters means a single counter does not have to account for as many connections, allowing ISNs to be incremented more aggressively and making it even harder for an attacker to guess correct sequence numbers. It is important to note, that the key or portions of keys used for given connection identifier should always belong to the same partition. Otherwise, it will not be able to satisfy many of the additional requirements listed above.

The present invention may also be described in terms of methods comprising functional steps and/or non-functional acts. The following is a description of acts and steps that may performed in practicing the present invention. Usually, functional steps describe the invention in terms of results that are accomplished whereas non-functional acts describe more specific actions for achieving a particular result. Although the functional steps and non-functional acts may be described or claimed in a particular order, the present invention is not necessarily limited to any particular ordering or combination of acts and/or steps.

Figure 6:
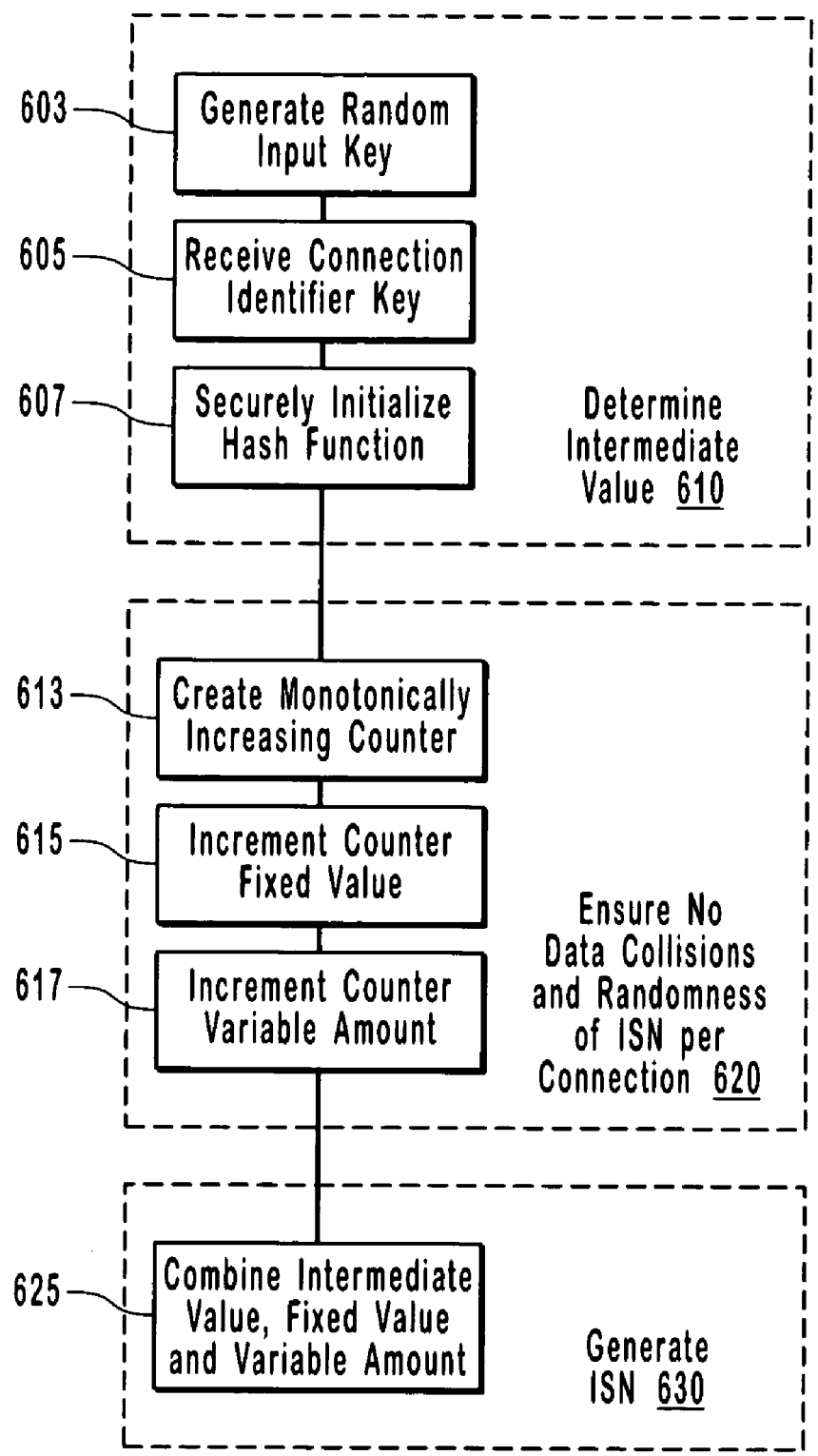
FIG. 6 illustrates example acts and steps for methods of generating a secure initial sequence number in accordance with example embodiments.

FIG. 6 illustrates exemplary steps and acts used for securely generating an ISN for use by a remote client when assigning sequence numbers to one or more data packets to be sent to a local server. As previously mentioned, the initial sequence number is to be generated in a manner that prevents the local server from being attacked while maintaining reliable data transfer. A step for determining 610 an intermediate value of the ISN may include the act of generating 603 a random input key. The random input key is generated using arbitrary information maintained secret by the local server. For example, the arbitrary information maintained as a secret by the local server may be based on timing, state conditions for the local server, or both, at boot up time of the local server. The secrets may include a time of day, a day of month, a month, a year, the local server hard drive head positions, whether input was detected by hardware of the local server (such as mouse movement), or other boot up and computer related data.

The step for determining 610 an intermediate value may also include the act of receiving 605 a connection identifier that includes connection information for at least the remote client. Other embodiments provide that the connection identifier key further includes connection information for the local service port, local server, routing address, remote port, and/or remote routing address. Finally, the step for determining 610 an intermediate value may include the act of securely initializing 607 hash function with at least a portion of the random input key and at least a portion of the connection identifier key.

Other example embodiments provide a step for ensuring 620 that a same connection identifier does not have data collisions from competing sequence numbers within a predetermined period of time, and for ensuring randomness of the initial sequence number on a per connection basis for preventing attacks on the local server. This step for ensuring 620 may include the act of creating 613 a monotonically increasing counter. Further, the step for ensuring 620 includes an act of incrementing 615 the counter a fixed value based on a passage of predetermined time period. Example embodiments provide that based on the fixed value, if a remote client's data transfer rate while connected to the local server is less than a specified byte rate then the connection identifier used by the remote client is allowed immediate re-connection to the local server after the remote client disconnects. For example, if the fixed value is 25.6K and the a remote client's data transfer rate while connected to the local server is less than 256K, then the connection identifier used by the remote client is allowed immediate reconnection to the local server after the remote client disconnects.

In addition to the act of incrementing 615 the counter a fixed value, the step for ensuring 620 includes the act of incrementing 617 the counter a variable amount depending upon a rate of connections with the local server. For example, if the rate of connections is beyond a threshold value the variable increment is based on an elapsed time. Otherwise, the variable increment is based on each connection established with the local server. Further embodiments provide that if the rate of connection is beyond the threshold value the variable increments up to an amount of 0x000022FB every milliseconds, otherwise the variable increment is an amount between 16 K and 32 K.

In still yet other example embodiments, a step for generating 630 an ISN may include the act of combining 625 intermediate value, fixed value and variable amount. This combination of the intermediate value, fixed value and variable amount may be performed by a mathematical operation or function that ensures the ISN increase is monotonic.

Other example embodiments provide that the counter is shared by at least two connections at the same time. Still other embodiments allow for multiple connections between the local server and multiple remote clients, wherein multiple counters are created and the fixed value and the variable amount are chosen based on at least a portion of the intermediate value. For example, embodiments provide for establishing at least a second connection between the local server and a second remote client. Accordingly, a second connection identifier is received that includes connection information for at least the second remote client. The hash function is then securely initialized using at least a portion of the random input key and at least a portion of the second connection identifier key for determining a second intermediate value of a second initial sequence number.

Based on at least a portion of the second connection identifier key, a second monotonically increasing counter is created for ensuring that a same connection identifier does not have data collisions from competing sequence numbers within a predetermined period of time, and for ensuring randomness of the second initial sequence number on a per connection basis for preventing attacks on the local server. The second counter is incremented the fixed value based on the passage of the predetermined time period. Further, the second counter is incremented a second variable amount depending upon a rate of connections with the local server and for those connections associated with the second counter, wherein if the rate of connections with the local server and for those connections associated with the second counter is beyond a threshold value the variable increment is based on an elapsed time. Otherwise the variable increment is based on each connection established with the local server and associated with the second counter. Finally, the second intermediate value, the fixed value and the second variable amount are combined for generating the second initial sequence number. It is noted, that although at least a portion of the connection identifier key was used in the above example embodiment to determine what counter should be used, any identifier that consistently assigns the connection identifier to the same counter can be used.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 7:
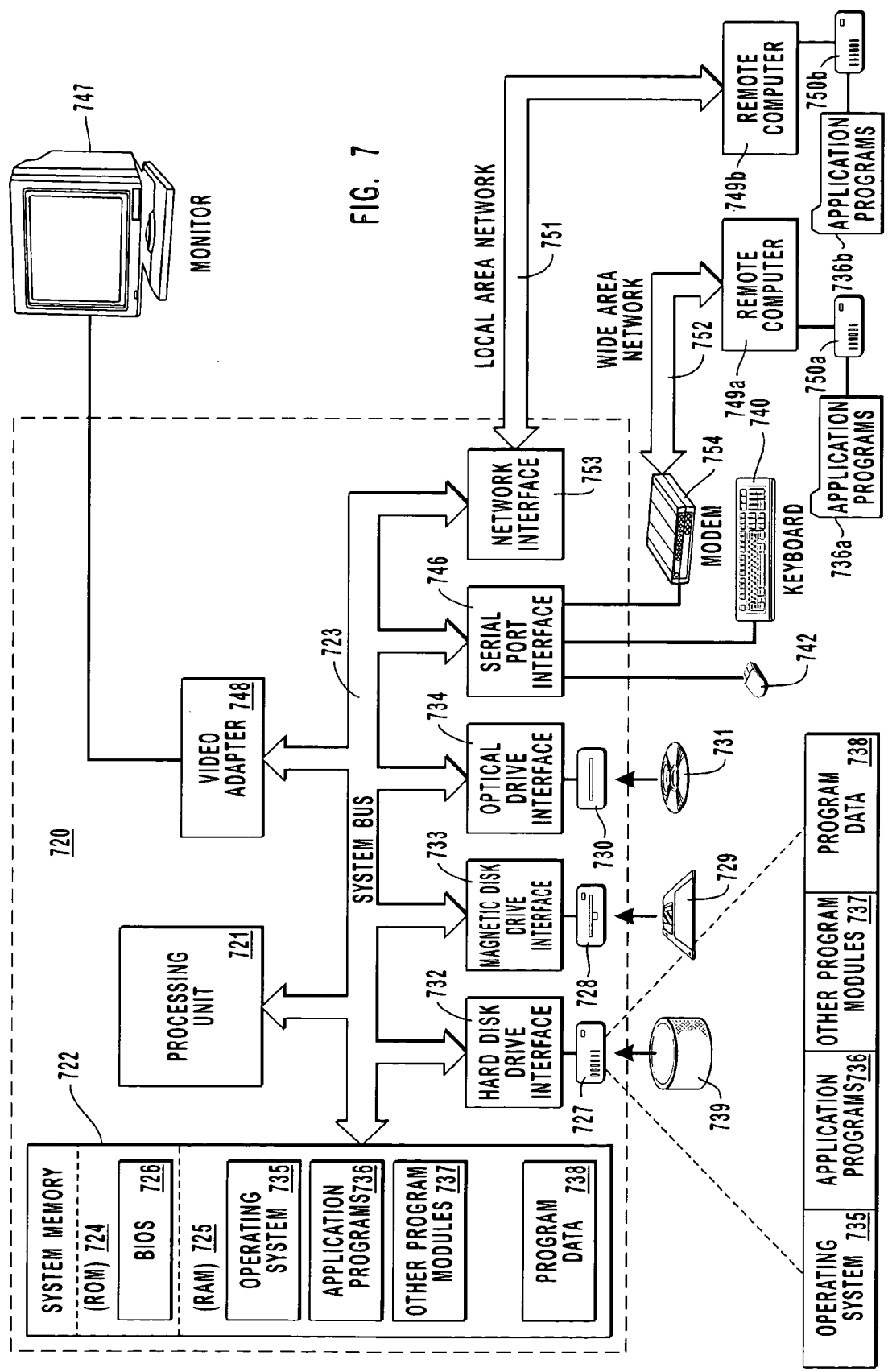
FIG. 7 illustrates an example system that provides a suitable operating environment for the present invention.

FIG. 7 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 7, an exemplary system for implementing the invention includes a general purpose computing device in the form of a conventional computer 720, including a processing unit 721, a system memory 722, and a system bus 723 that couples various system components including the system memory 722 to the processing unit 721. The system bus 723 may be any of several types of bus structures including a memory bus or memory controller, a peripheral bus, and a local bus using any of a variety of bus architectures. The system memory includes read only memory (ROM) 724 and random access memory (RAM) 725. A basic input/output system (BIOS) 726, containing the basic routines that help transfer information between elements within the computer 720, such as during start-up, may be stored in ROM 724.

The computer 720 may also include a magnetic hard disk drive 727 for reading from and writing to a magnetic hard disk 739, a magnetic disk drive 728 for reading from or writing to a removable magnetic disk 729, and an optical disk drive 730 for reading from or writing to removable optical disk 731 such as a CD-ROM or other optical media. The magnetic hard disk drive 727, magnetic disk drive 728, and optical disk drive 730 are connected to the system bus 723 by a hard disk drive interface 732, a magnetic disk drive-interface 733, and an optical drive interface 734, respectively. The drives and their associated computer-readable media provide nonvolatile storage of computer-executable instructions, data structures, program modules and other data for the computer 720. Although the exemplary environment described herein employs a magnetic hard disk 739, a removable magnetic disk 729 and a removable optical disk 731, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 739, magnetic disk 729, optical disk 731, ROM 724 or RAM 725, including an operating system 735, one or more application programs 736, other program modules 737, and program data 738. A user may enter commands and information into the computer 720 through keyboard 740, pointing device 742, or other input devices (not shown), such as a microphone, joy stick, game pad, satellite dish, scanner, or the like. These and other input devices are often connected to the processing unit 721 through a serial port interface 746 coupled to system bus 723. Alternatively, the input devices may be connected by other interfaces, such as a parallel port, a game port or a universal serial bus (USB). A monitor 747 or another display device is also connected to system bus 723 via an interface, such as video adapter 748. In addition to the monitor, personal computers typically include other peripheral output devices (not shown), such as speakers and printers.

The computer 720 may operate in a networked environment using logical connections to one or more remote computers, such as remote computers 749a and 749b. Remote computers 749a and 749b may each be another personal computer, a server, a router, a network PC, a peer device or other common network node, and typically include many or all of the elements described above relative to the computer 720, although only memory storage devices 750a and 750b and their associated application programs 736a and 736b have been illustrated in FIG. 7. The logical connections depicted in FIG. 7 include a local area network (LAN) 751 and a wide area network (WAN) 752 that are presented here by way of example and not limitation. Such networking environments are commonplace in office-wide or enterprise-wide computer networks, intranets and the Internet.

When used in a LAN networking environment, the computer 720 is connected to the local network 751 through a network interface or adapter 753. When used in a WAN networking environment, the computer 720 may include a modem 754, a wireless link, or other means for establishing communications over the wide area network 752, such as the Internet. The modem 754, which may be internal or external, is connected to the system bus 723 via the serial port interface 746. In a networked environment, program modules depicted relative to the computer 720, or portions thereof, may be stored in the remote memory storage device. It will be appreciated that the network connections shown are exemplary and other means of establishing communications over wide area network 752 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a local server that receives data from one or more remote clients over a data transport protocol, a method of generating an initial sequence number (ISN) for use by a remote client when assigning sequence numbers to one or more data packets to be sent to the local server, the initial sequence number generated in a manner that prevents the local server from being attacked while maintaining reliable data transfer, the method comprising:

generating a random input key using a secret maintained by the local server;

receiving a connection identifier key that includes connection information for at least the remote client;

securely initializing a hash function with at least a portion of the random input key and at least a portion of the connection identifier key;

calculating an intermediate value using the initialized hash function;

creating a monotonically increasing counter for ensuring that a same connection identifier does not have data collisions from competing sequence numbers within a predetermined period of time, and for ensuring randomness of the initial sequence number on a per connection basis for preventing attacks on the local server, the counter taking both timer information and connection rate information as input;

incrementing the counter a fixed value based on a passage of a predetermined time period;

detecting a connection rate for the local server, the connection rate being determined by detecting each connection to the local server and a connection rate evaluator determining the number of connections per unit time;

determining a variable amount based upon the connection rate, the variable amount being determined by at least comparing the connection rate to a threshold value and by choosing a random number between a minimum ISN increase per connection and a maximum ISN increase per connection;

incrementing the counter by the variable amount;

combining the fixed value and the variable amount to create a random value; and combining the intermediate value and the random value using a monotonically increasing mathematical function to generate the initial sequence number.

2. The method of claim 1, wherein if the connection rate is below the threshold value, the fixed value is further incremented based on each connection established with the local server.

3. The method of claim 2, wherein based on the fixed value, if a remote client's data transfer rate while connected to the local server is less than a specified byte rate then the connection identifier used by the remote client the is allowed immediate re-connection to the local server after the remote client disconnects.

4. The method of claim 1, wherein the connection identifier key further includes connection information for one or more of the local server port, local server routing address, remote port and remote routing address.

5. The method of claim 4, wherein the data transport protocol is Transmission Control Protocol (TCP), and wherein the local and remote routing addresses are Internet Protocol (IP) addresses.

6. The method of claim 1, wherein at least a second connection is made between the local server and a second remote client, and wherein the method further including the acts of:

receiving a second connection identifier key that includes connection information for at least the second remote client;

securely initializing the hash function with at least a portion of the random input key and at least a portion of the second connection identifier key for determining a second intermediate value of a second initial sequence number;

based on at least a portion of the second connection identifier key, creating a second monotonically increasing counter for ensuring that a same connection identifier does not have data collisions from competing sequence numbers within a predetermined period of time, and for ensuring randomness of the second initial sequence number on a per connection basis for preventing attacks on the local server;

incrementing the second counter the fixed value based on the passage of the predetermined time period;

incrementing the second counter a second variable amount depending upon a rate of connections with the local server and for those connections associated with the second counter, wherein if the rate of connections with the local server and for those connections associated with the second counter is beyond a threshold value the variable increment is based on an elapsed time, otherwise the variable increment is based on each connection established with the local server and associated with the second counter; and combining the second intermediate value, the fixed value and the second variable amount for generating the second initial sequence number.

7. The method of claim wherein 1, wherein the arbitrary information maintained as a secret by the local server is based on timing, state conditions for the local server, or both, at boot up time of the local server, which include one or more of a time of day, a day of month, a month, a year, a local server hard drive head position, and whether input was detected by hardware of the local server.

8. The method of claim 1, wherein if the connection rate is beyond the threshold value the variable increments up to an amount of 0×000022FB every millisecond, otherwise the variable increment is an amount between 16 K and 32 K.

9. The method of claim 1, wherein the monotonically increasing counter is shared by at least two connections at the same time.

10. For a local server that receives data from one or more remote clients over a data transport protocol, a computer program product comprising computer readable storage media carrying computer executable instructions that implement a method of generating an initial sequence number for use by a remote client when assigning sequence numbers to one or more data packets to be sent to the local server, the initial sequence number generated in a manner that prevents the local server from being attacked while maintaining reliable data transfer, the method comprising the method of claim 1.

11. The computer program product of claim 10, wherein if the connection rate is below the threshold value, the fixed value is further incremented based on each connection established with the local server.

12. The computer program product of claim 11, wherein the fixed value is 25.6 K, and wherein if a remote client's data transfer rate while connected to the local server is less than 256 K then the connection identifier used by the remote client the is allowed immediate re-connection to the local server after the remote client disconnects.

13. The computer program product of claim 10, wherein the connection identifier key further includes connection information for one or more of the local server port, local server routing address, remote port and remote routing address.

14. The computer program product of claim 13, wherein the data transport protocol is Transmission Control Protocol (TCP), and wherein the local and remote routing addresses are Internet Protocol (IP) addresses.

15. The computer program product of claim 10, wherein at least a second connection is made between the local server and a second remote client, and wherein the computer executable instructions further implement the method including the acts of:

receiving a second connection identifier key that includes connection information for at least the second remote client;

securely initializing the hash function with at least a portion of the random input key and at least a portion of the second connection identifier key for determining a second intermediate value of a second initial sequence number;

based on at least a portion of the second connection identifier key, creating a second monotonically increasing counter for ensuring that a same connection identifier does not have data collisions from competing sequence numbers within a predetermined period of time, and for ensuring randomness of the second initial sequence number on a per connection basis for preventing attacks on the local server;

incrementing the second counter the fixed value based on the passage of the predetermined time period;

incrementing the second counter a second variable amount depending upon a rate of connections with the local server and for those connections associated with the second counter, wherein if the rate of connections with the local server and for those connections associated with the second counter is beyond a threshold value the variable increment is based on an elapsed time, otherwise the variable increment is based on each connection established with the local server and associated with the second counter; and combining the second intermediate value, the fixed value and the second variable amount for generating the second initial sequence number.

16. The computer program product of claim wherein 10, wherein the arbitrary information maintained as a secret by the local server is based on timing, state conditions for the local server, or both, at boot up time of the local server, which include one or more of a time of day, a day of the month, a month, a year, the local server hard drive position, and whether input was detected by hardware of the local server.

17. The computer program product of claim 10, wherein when the connection rate is beyond the threshold value the variable increments up to an amount of 0x000022FB every millisecond, otherwise the variable increment is an amount between 16 K and 32 K.

18. The computer program product of claim 10, wherein the monotonically increasing counter is shared by at least two connections at the same time.

* * * * *